(12) United States Patent (10) Patent No.: US 7,679,510 B2
Feldenzer (45) Date of Patent: Mar. 16, 2010

(54) RFID PRODUCT IDENTIFICATION AND TRACKING SYSTEM

(75) Inventor: Kevin L. Feldenzer, Palmyra, PA (US)

(73) Assignee: Hershey Chocolate and Confectionary Corporation, Wheat Ridge, CO (US)

( * ) Notice: Subject to any disclaimer, the term of this patent is extended or adjusted under 35 U.S.C. 154(b) by 728 days.

(21) Appl. No.: 11/348,557

(22) Filed: Feb. 6, 2006

(65) Prior Publication Data
US 2007/0185613 A1  Aug. 9, 2007

(51) Int. Cl.
*G08B 13/14* (2006.01)
(52) U.S. Cl. .............................. 340/572.1; 198/341.04; 198/437; 340/686.2; 700/226
(58) Field of Classification Search .............. 340/572.1, 340/572.8, 10.1, 10.4–10.42, 10.51, 686.2, 340/686.1; 700/225–227; 414/749.1; 198/339.1, 198/340, 341.01, 341.03, 341.04, 348, 890, 198/434, 436, 437
See application file for complete search history.

(56) References Cited

U.S. PATENT DOCUMENTS

| | | | |
|---|---|---|---|
| 5,763,867 A | 6/1998 | Main et al. | |
| 5,971,587 A * | 10/1999 | Kato et al. | ................... 700/225 |
| 5,977,913 A | 11/1999 | Christ | |
| 6,844,821 B2 | 1/2005 | Swartzel et al. | |
| 6,851,615 B2 | 2/2005 | Jones | |
| 6,859,745 B2 | 2/2005 | Carr et al. | |
| 6,883,710 B2 * | 4/2005 | Chung | ........................ 235/385 |
| 6,930,296 B2 | 8/2005 | Chen | |
| 2006/0131405 A1* | 6/2006 | Schneider | ................. 340/572.7 |
| 2006/0187041 A1* | 8/2006 | Olsen et al. | .............. 340/572.1 |
| 2007/0126578 A1* | 6/2007 | Broussard | ................. 340/572.1 |

* cited by examiner

*Primary Examiner*—Thomas J Mullen
(74) *Attorney, Agent, or Firm*—Paul & Paul (57) ABSTRACT

Apparatus for RFID tagging of packages is provided, including a conveyor, along which tags having microchips and antennae are applied to packages, with the tags being encoded via radio waves, to contain information about packaged identification and other information, with the encoding being done upstream of a palletizer system, and with the palletizer system being provided for receiving encoded packages from the conveyor.

11 Claims, 8 Drawing Sheets

RFID PRODUCT IDENTIFICATION AND TRACKING SYSTEM

BACKGROUND OF THE INVENTION

It is known in the prior art to apply product identification to cartons, packages and the like, often by means of application of a bar code or other such identification system.

Radio frequency identification (RFID) has developed as a technology for identifying packages, to facilitate their tracking and to more readily determine the information that has been applied to the package.

Typically RFID technology includes the placement of a tag in the form of a microchip with an antenna on the package, such that the microchip can be encoded with information via the antenna, so that one can subsequently use a reader to read data off the microchip. Typically, the technology uses radio waves.

The RFID tags (or transponders) can either be of the active RFID systems, or they can be of the passive RFID systems.

Active RFID systems are ones in which the chip sends out a signal when it approaches a reader. Typically, such active systems must employ batteries, but being active systems, have a wide range, but generally are more costly than passive RFID systems.

Passive RFID systems employ tags with no power source and no transmitter. However they do employ a microchip and an antenna, to which the microchip is electrically connected.

Because passive tags operate at generally lower frequencies, and because they do not employ batteries, they have limitations on the distance at which they can be read from a reader. However, because they are less costly than active systems, passive tags can be used to tag packages or other items, and eventually discarded.

SUMMARY OF THE INVENTION

The present invention is directed to an apparatus and method for RFID tagging of packages such as boxes of candies or other goods, in which a conveyor is used for transporting the packages, with the RFID tags being applied to the packages, with the RFID tags being encoded via a transmitter, and with the encoding being done in the proximity of a palletizer system that receives packages from the conveyor and delivers them to a pallet.

Accordingly, it is an object of this invention to provide a method and apparatus for RFID tagging of packages as they are delivered along a conveyor, by encoding tags applied to the packages with information related to the goods being packaged, its history, date of manufacture, location of manufacture, or any other information of interest, for use by the manufacturer of the packaged goods, by a customer for such goods, for warehouse control, or for any other purpose.

It is another object of this invention to accomplish the above object, wherein the system recognizes pre-existing information appearing on the package, such as on a barcode or the like, and for sensing such information, irrespective the height of the package itself, and for delivering such information to a tag either already applied to a package or about to be applied to a package.

It is another object of this invention to accomplish the above objects, wherein a palletizer system is used, in which a plurality of receiving lines are adapted to receive packages from the conveyor and to deliver them to pallet stations.

It is another object of this invention to accomplish the above objects, wherein the application of the tags to packages can be vertically adjustable, depending upon the height of the package and/or the height of application of the tag to the package.

It is a further object of this invention to accomplish the above objects, wherein various functions of the tagging are computer-operated.

It is another object of this invention to accomplish the above objects, whereby application of tags to packages is by means of separating tags from a tape having multiple tags thereon, and delivering them to the packages via fluid-application.

It is a further object of this invention to accomplish the above objects, wherein the encoding of the tags is accomplished at a location proximate the situs of tag application to the package.

Other objects of the invention will be readily apparent upon a reading of the following brief descriptions of the drawing figures, the detailed descriptions of the preferred embodiments, and the appended claims.

DETAILED DESCRIPTION OF THE PREFERRED EMBODIMENTS

Figure 1:
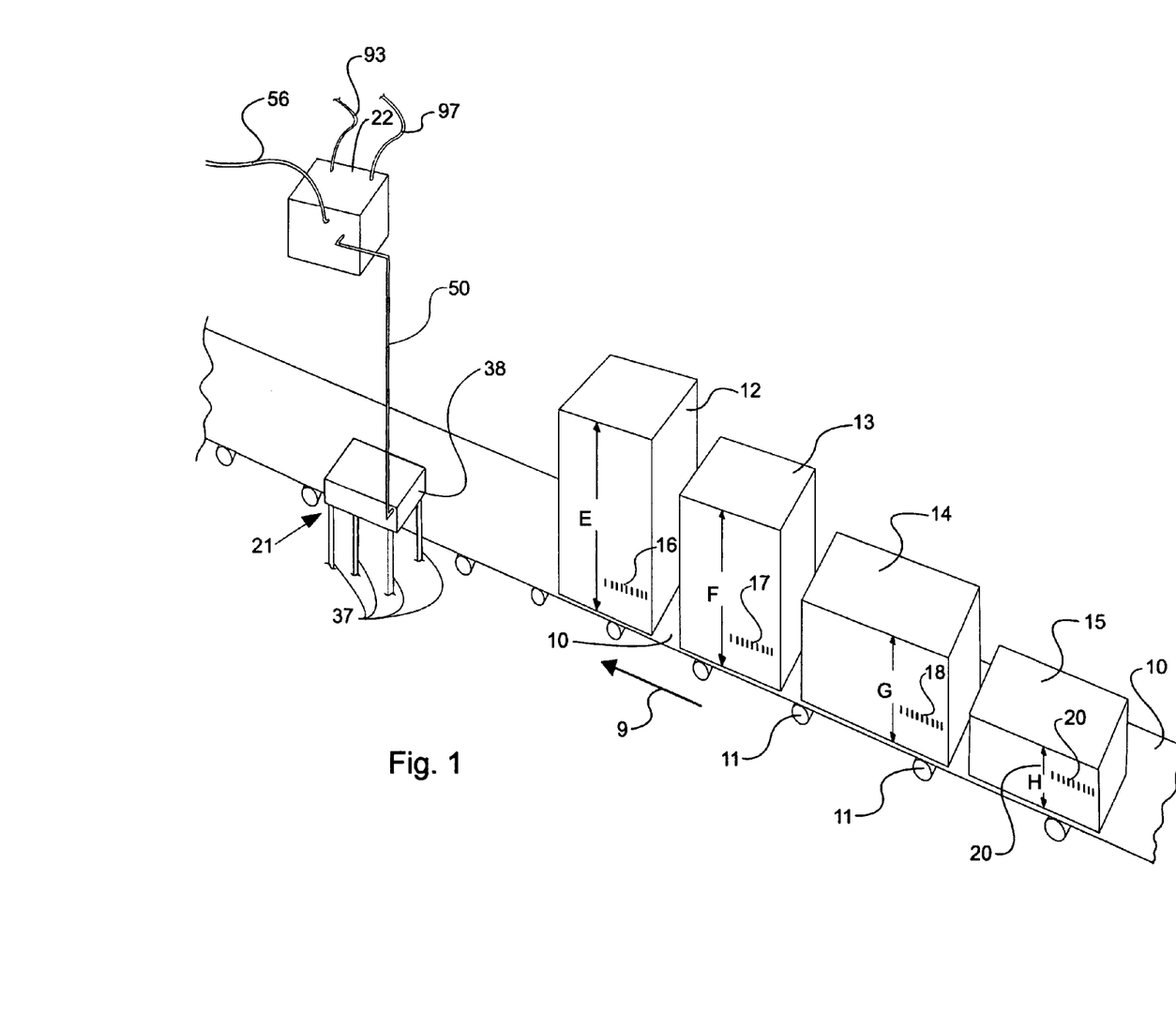
FIG. 1 is a diagrammatic foreshortened view, in perspective, of a package conveying line, and of a sensing system for sensing information already applied to the packages, and for delivering the information to a computer.

Referring now to the drawings in detail, reference is first made to FIG. 1, wherein a conveyor 10 is illustrated, mounted on a plurality of rollers such as those 11, with the conveyor 10 traveling in the direction indicated by the arrow 9, from right to left, for transporting packages 12, 13, 14, 15, etc. of various heights, with the packages carrying product identification on the exterior thereof, such as in the form of barcodes 16, 17, 18 and 20, and with the packages being at various heights "E", "F", "G", and "H", as shown in FIG. 1.

Thus, the packages 12-15 or the like can be delivered past a sensor box 38 at a sensing station generally shown at 21.

At the sensing station 21 there is a master computer 22.

Figure 2:
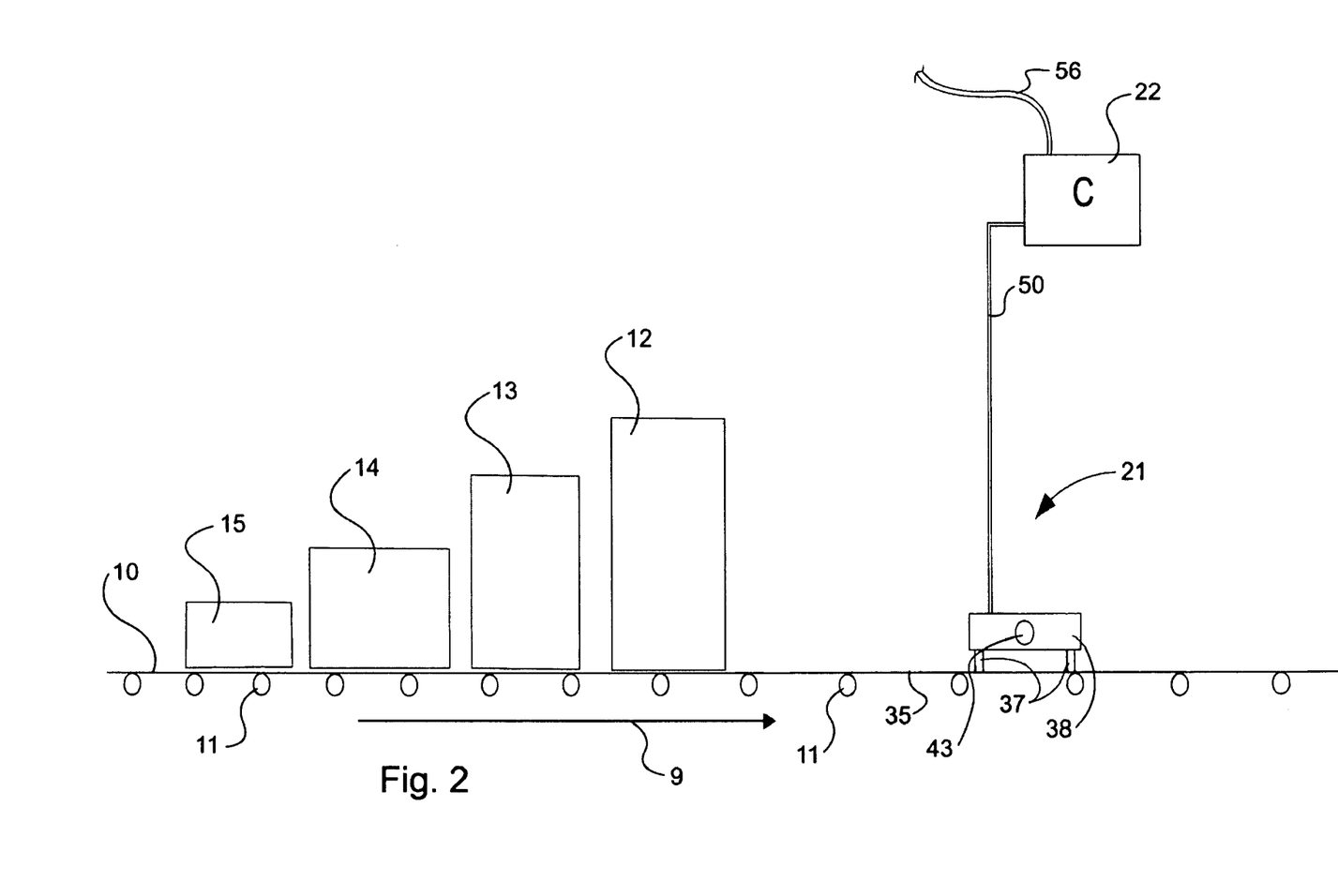
FIG. 2 is a diagrammatic vertical elevational view, taken along a remote side of the conveyor from that illustrated in FIG. 1.

Thus, the infrared or other type of sensor 43 on sensor box 38 (FIG. 1), on supports 37 will detect the barcodes 16, 17, 18 and 20 (FIG. 1), for example, and transmit the information read from those barcodes or other indicia back to the computer 22 (FIG. 1), via appropriate respective electrical connector line 50.

Figure 3:
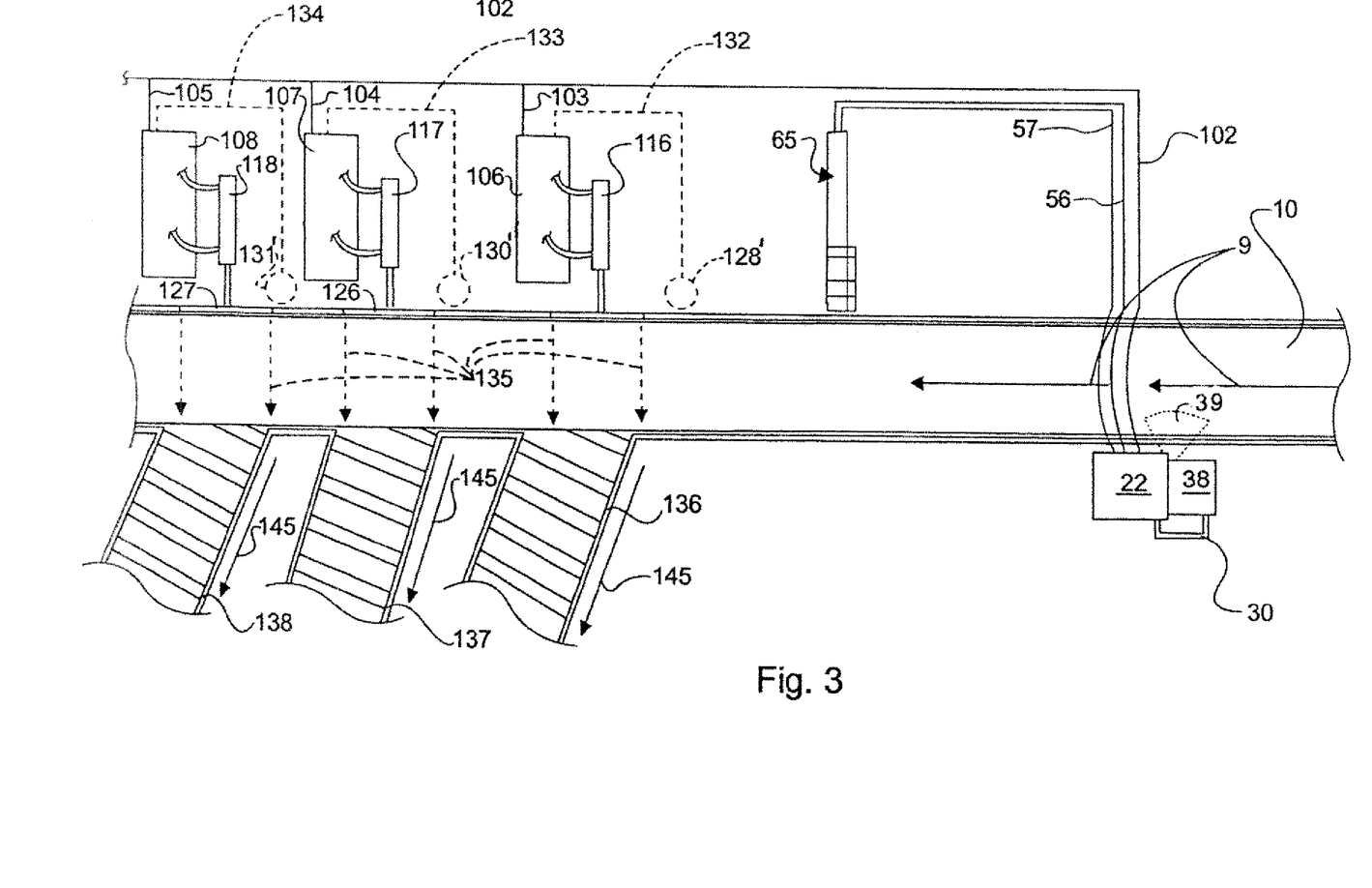
FIG. 3 is a top plan view of the conveyor and sensing system of FIGS. 1 and 2, and with conveyor receiving lines and means for discharging packages from the conveyor, to various ones of the receiving lines, with the illustration of FIG. 3 being fragmentally foreshortened in the longitudinal direction.

It will also be apparent that the sensor 43 (FIG. 2) has the ability to cover a range as is shown by the array 39, as indicated in plan view at the right end of FIG. 3.

Figure 4:
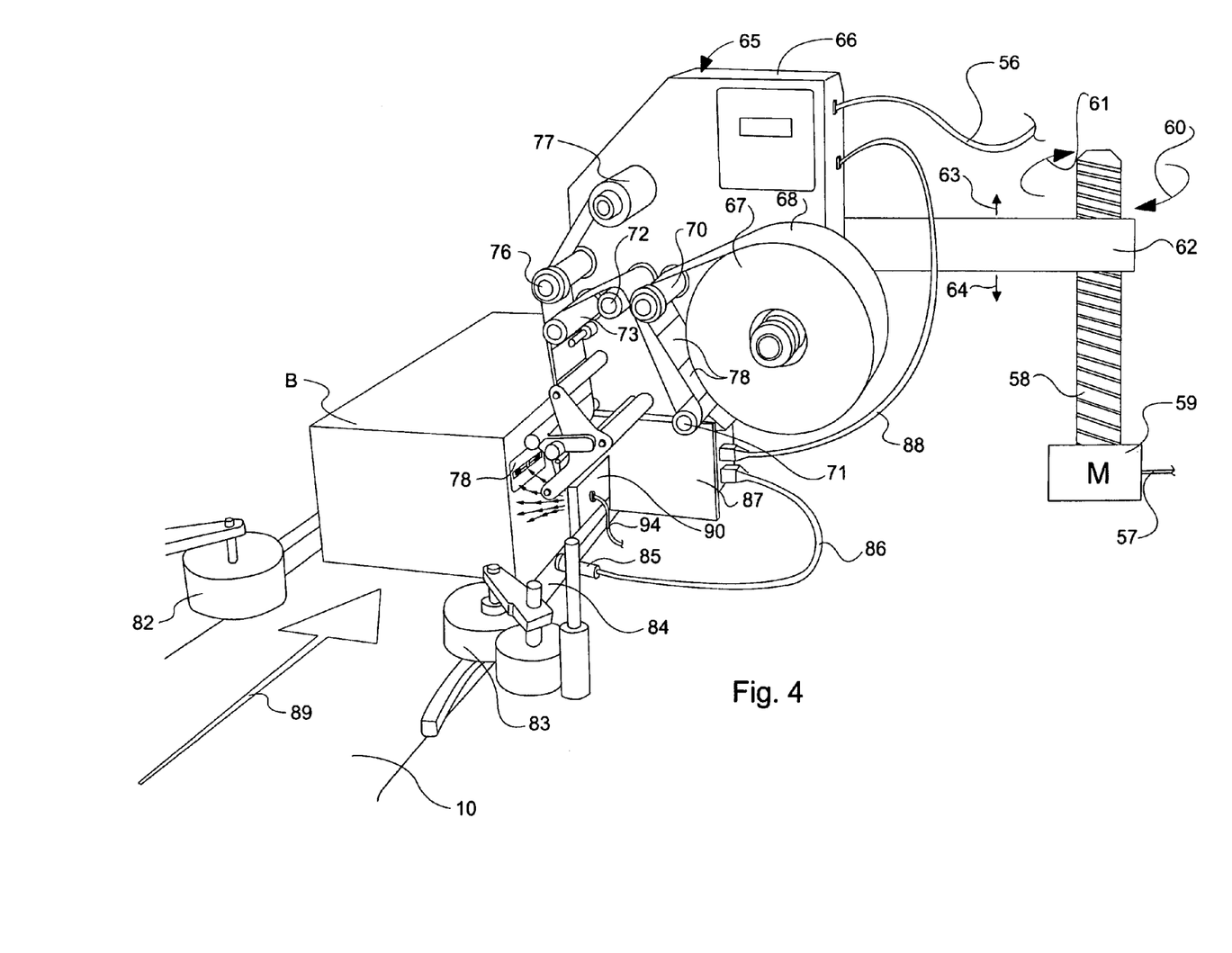
FIG. 4 is a perspective view of the tag application system in accordance with this invention, looking downstream of the conveyor, and wherein the details of the tag application system are more clearly illustrated.

The applicator system 65 (FIG. 3) includes its own control box 66 (FIG. 4).

The applicator system 65 is operated from computer 22 (FIG. 3), via control line 56, for controlling the vertical position upwardly and downwardly of the applicator system 65, in the directions of the arrows 63, 64.

Such vertical positioning for the applicator mechanism system 65 is by controlling the direction of rotation of a screw-type vertically disposed drive shaft 58, via electric line 57 which controls a drive motor 59 or the like, which engages with a ball bushing or the like (not shown) inside a vertically moveable applicator lift bar 62, as the vertical shaft 58 is driven rotationally in one of the directions 60, 61, illustrated by the arrows in FIG. 4, to drive the lift bar 62 upwardly or downwardly in the direction of one of the arrows 63, 64, to raise or lower the entire applicator system 65, as may be desired, to accommodate the placement of a tag at a predetermined vertical height on a box "B" as shown in FIG. 4.

Mounted on the vertically moveable applicator system 65 is a roll 67 of tape 68, that carries a plurality of tags 78 at regularly spaced-apart intervals, which tags 78 are adhesively carried on the tape 68, but are removable therefrom as will be described in detail later herein.

Thus, the roll 67 is shaft-mounted as shown, for rotation, with the tape 68 passing over an idler roll 70, to be delivered downwardly, around another idler roll 71, then upwardly over yet another idler roll 72, then leftwardly as shown in FIG. 4, around idler roll 73.

Figure 4A:
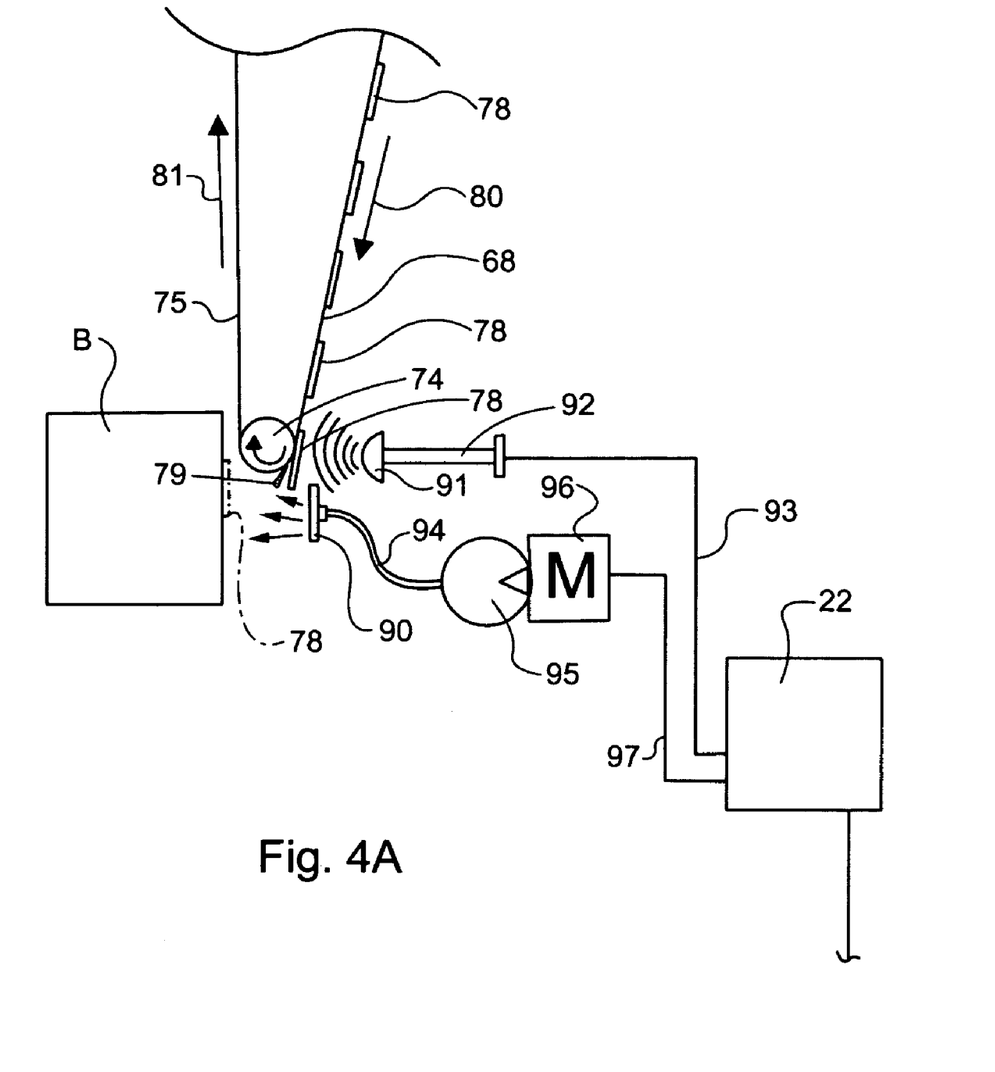
FIG. 4A is a fragmentary diagrammatic view of the fluid-delivery of tags from a tag-carrying tape to a package on the conveyor, with the tag encoding transmitter and the connection of the same to a computer being more clearly shown.

With reference now to FIG. 4A, the tape 68, with the tag 78 still carried thereon, passes around drive roll 74, which is rotating in the direction shown, wherein a means for removal of tag 78 is provided, in the form of a doctor blade or scraper blade 79, which scrapes the surface of the tape 68, removing a tag 78 therefrom as the tape 68 moves in the downward direction indicated by the arrow 80. After the tag 78 is scraped from the tape 68, the tape 68 then moves upwardly as shown by its upwardly moveable tape run 75 traveling in the direction of arrow 81.

As the tag 78 is scraped from the tape 68, a box "B" as shown in FIGS. 4 and 4A has been moved along the conveyor 10 in the direction of the arrow 89, appropriately centrally positioned thereon by means of positioning rollers 82, 83, with the box "B" disposed against a longitudinally oriented guide 84, whereupon a position sensor 85 detects the position of the box "B" and transfers that information regarding the position of the box via an electric line 86, to a control zone 87 of the applicator system 65. The control zone 87 is connected via control line 88 to control zone 66, which controls the delivery of tags via tape, by means of controlling the rotation of roller 74.

As a tag 78 is scraped from the tape 68 as shown in FIG. 4A, by means of the doctor blade 79, a motor 96 controls the operation of a valve 95, to deliver compressed air via line 94 to an air delivery plate 90, in order to provide a fluid drive application of the tag 78 onto a box "B", as is shown in phantom for the tag 78 in FIG. 4A.

The motor 96 is controlled from the computer 22 via control line 97.

Figure 5:
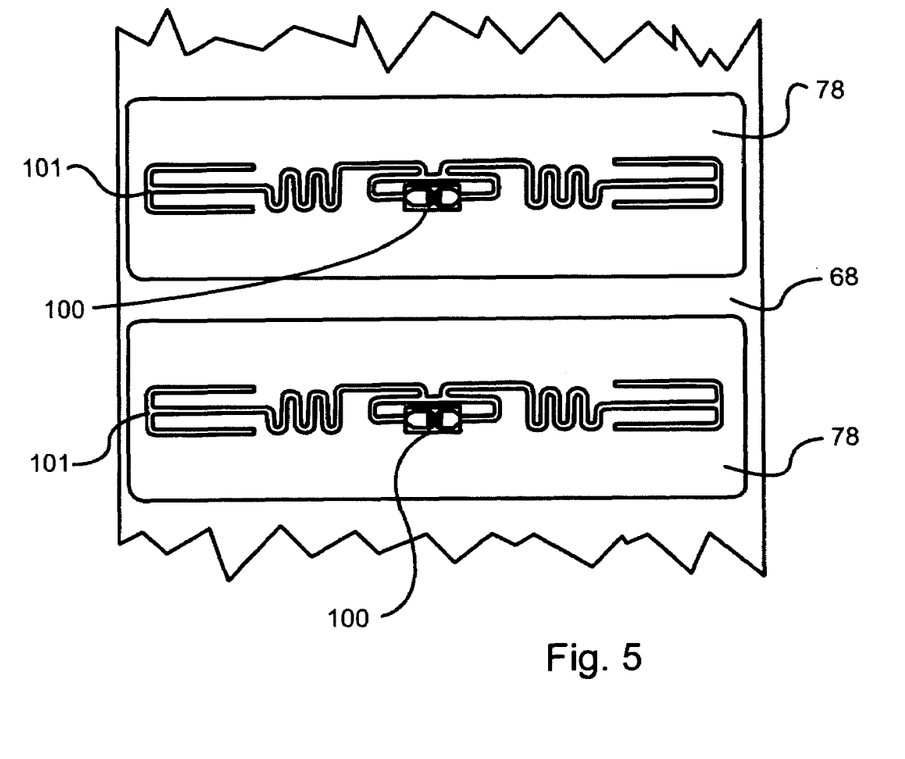
FIG. 5 is an enlarged fragmentary view of a tag-delivering tape, with a plurality of tags shown thereon, each with a chip and its antenna connected thereto.

Substantially contemporaneous with or slightly before or after application of the tag 78 to a box "B" as shown in FIG. 4A, the computer 22, having received information regarding the packages being delivered along the conveyor from the barcodes or other information (i.e., information related to the goods being packaged, its history, date of manufacture, location of manufacture, or any other information of interest) transforms such information into a code, and transmits the same to a tag 78 via radio waves, which engage the antenna 101 of a tag 78 as shown in FIG. 5, for example, for imparting such information onto an electronic chip 100 carried on the tag 78, such that the encoded information is carried by the tag 78 as shown in phantom in FIG. 4A, having been encoded thereon via a radio frequency transmitter 91 carried on transmitter mount member 92, which receives the information from the computer 22 via line 93.

With reference now to the left end of FIG. 3 and to FIG. 6, the thus-encoded boxes "B" (not shown) continue to travel along the conveyor 10 in the direction indicated by the arrows 9 in FIG. 3, to various discharge stations, wherein the packages or boxes "B" may be transported from the conveyor 10 to various conveyor receiver lines, for further delivery to various pallet stations as will now be described.

Figure 6:
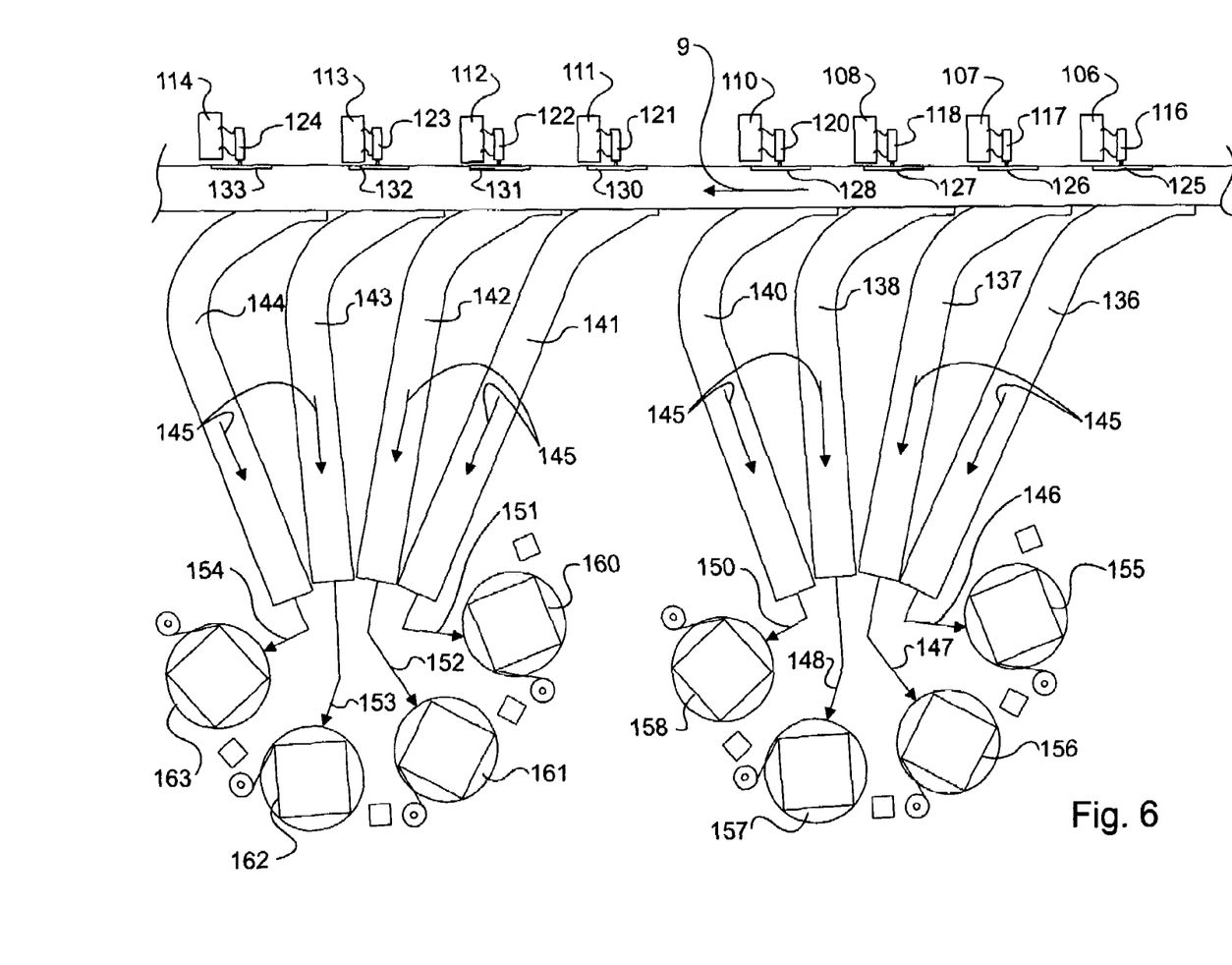
FIG. 6 is a diagrammatic top plan view of the left portion of the conveyor system illustrated in FIG. 3, wherein means are shown for moving packages being delivered along the conveyor, to receiving lines, which in turn, feed pallet stations for receiving packages already encoded.

In one embodiment of the invention, the computer 22, remembering the sequence of various boxes "B" as have already been tagged, can deliver such information via control line 102 to various discharge controllers such as those 106, 107, 108, 110, 111, 112, 113 and 114, and, with respect to controllers 106-108, via lines 103-105, in order to control the timing of box pushers or like mechanisms 116, 117, 118, 120, 121, 122, 123 and 124, which, respectively carry box pusher plates 125, 126, 127, 128, 130, 131, 132 and 133, for pushing boxes from the conveyor 10 onto an appropriate one of the receiver conveyor lines 136, 137, 138, 140, 141, 142, 143 and 144, as shown in FIGS. 3 and 6 in the direction of the arrows 135 (FIG. 3).

As an alternative to the operation of the discharge pushers 116, 117, 118, 120, 121, 122, 123 and 124 being operated in a predetermined or "remembered" sequence via the computer, the pushers can be actuated individually. In this regard each such pusher, 116, 117, 118, etc. may be actuated by its own box or package sensor 128', 130', 131', etc. (shown in phantom), operating its respective pusher 116, 117, 118, etc. via its own control line 132, 133, 134, (shown in phantom) to operate via respectively associated pusher controllers 106, 107, 108, etc., and thus push boxes from conveyor 10, by means of pusher plates 125, 126, 127, 128, 130, 131, 132 and 133 onto a respectively associated With reference to FIG. 6, it will thus be seen that boxes or other packages being delivered from the receiver conveyor lines 136, 137, 138, 140, 141, 142, 143 and 144, will be transferred to respective pallet stations 155, 156, 157, 158, 160, 161, 162 and 163 via appropriate transfer mechanisms 146, 147, 148, 150, 151, 152, 153 and 154, respectively.

Figure 7:
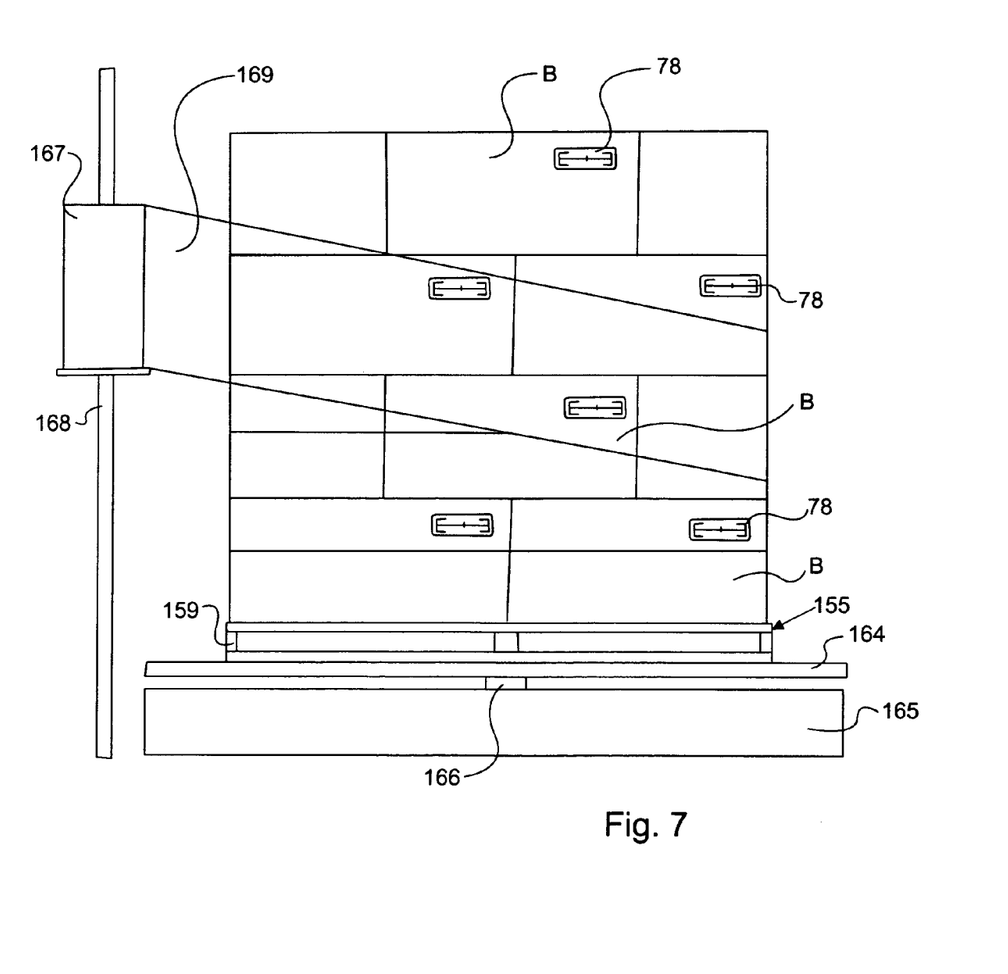
FIG. 7 is an enlarged view of one of the pallet stations illustrated in FIG. 6, in vertical elevation, and with a means for wrapping a plurality of containers on a given pallet with a wrapping material, for retaining them on a pallet for transport.

With reference to FIG. 7, a typical pallet station 155 is illustrated, wherein a pallet 159 is carried on a rotatable pallet plate 164, which in turn is shaft-mounted at 166, onto a floor-mounted pallet rotator mechanism 165, with the boxes "B" being stacked onto the pallet 159, in some manner such as that shown, with each of the boxes carrying an encoded tag 78, as described above.

It will be understood that the particular pallet station 155 as shown in FIG. 7, while being described as being a rotatable pallet station, could, if desired, be a fixed pallet station. However, in some instances it will be convenient to use a rotatable pallet station as shown in FIG. 7, especially if a full pallet load is to be wrapped to secure the boxes "B" on the pallet 159.

In a situation where the boxes "B" are to be wrapped as shown in FIG. 7, a roll 167 of wrapping material, such as a transparent shrink wrap, if desired, may be rotationally carried on a vertically disposed post 168, such that, when the pallet rotating mechanism 165 is actuated to rotate the pallet plate 164 and the pallet 159 carried thereon, the pallet load of boxes "B", will rotate, and a web of wrapping material, such as for example, a shrink wrap 169 may be wrapped around the pallet load of boxes "B", for delivery to a warehouse, for storage or the like.

In the event that the application of a tag 78, by means of the applicator system or mechanism 65 should fail, such that if a given box "B" does not properly receive a tag 78, it would not be desirable for a box "B" to be placed onto a pallet. To this end, the sensors, such as those 128', 130', 131', etc. can recognize that a given box "B" either contains no tag 78, or that the tag 78 is not properly carried by the box "B", and the sensors 128', 130', 131', etc. would not actuate the pusher mechanisms 116, 117, 118, etc. and such a box "B" with an inactive tag or improperly applied tag, or no tag at all, would be allowed to continue to pass along the conveyor 10, without being discharged therefrom to one or more of the receiver conveyor lines described above, such that it does not become stacked on a pallet.

Alternatively, the computer 22, itself, at the time that it is controlling the encoded information onto a tag 78 as shown in FIG. 4A, may recognize that a tag is not properly installed, or has not been properly activated, and the computer 22 can thus be programmed not to activate any of the controllers 106, 107, 108, 110, 111, 112, 113, or 114, so that a box "B" without a properly activated tag 78 will not be discharged from the conveyor 10, onto one of the receiver conveyor lines and will not therefor be delivered to a pallet station.

It will be apparent from the foregoing that various modifications may be made in the details of construction as well as in the use and operation of this invention, within the spirit and scope of the appended claims. For example, the tags 78 that are carried on the tape 68, after being removed from the tape 68 via the doctor blade 79, will stick onto a box "B", by means of adhesive present on the box-facing surface of the tag 78, such as by a pressure sensitive adhesive.

It will also be apparent that in accordance with this invention, the tagging of boxes "B" is being done just prior to the pallet stations, although such can be done, if desired, at an "upstream" location in production, such as earlier along a production line, rather than at the pallet station.

Additionally, it will be understood that in some cases the boxes "B", may be provided with their chips and antennae already embedded in the boxes, or on the boxes, either in the form of a tag, or in some other form, thereby bypassing the tag applicator system 65 in accordance with this invention. It will also be understood that the boxes "B", as shown in FIG. 4 can have the tags applied thereto, either while the boxes are still moving along the conveyor, or the conveyor 10 can be momentarily stopped depending upon the programming of the computer 22 actuated through the applicator system 65 upon detection of a box "B" by the position sensor 85, for application of the tags 78, as may be desired.

What is claimed is:

1. Apparatus to RFID tagging of packages comprising:
   a conveyor for transporting packages along a predetermined path, with tags having microchips and antennae applied to the packages;
   a sensor for reading information including bar codes or other indicia from each package transported on said conveyor as a package passes the sensor;
   a central computer connected to the sensor to receive the information on each package passing from said sensor;
   encoding means including a transmitter for encoding the tags by transmitting radio waves providing information about package identification to the microchips of the tags, via the antennae of the tags, the encoding means being controlled by the central computer;
   tag applying means for applying an encoded tag to a package proximate thereto, the tag applying means being controlled by the central computer;
   verifying means for verifying said applied tag for proper installation and proper activation, the verifying means being connected to the central computer; and
   a palletizer system at a predetermined location downstream from the tag applying means for removing encoded packages from the conveyor and delivering at least some encoded packages to at least one pallet station, the palletizer system being connected to receive signals from the central computer;
   wherein the encoding means is disposed upstream of the location of the palletizer system;
   wherein the palletizer system includes:
   at least one discharge station positioned along the transport conveyor, the operation of which is determined by a signal from the central computer;
   at least one receiver conveyor line connected to a respective discharge station; and
   at least one pallet station connected to a respective receiver line;
   wherein each respective discharge station has a discharge controller, a pusher mechanism controlled by said discharge controller, and a pusher plate movable by said pusher mechanism to contact a designated package; and
   wherein the discharge controller is connected to said central computer to receive designated package information, wherein the discharge controller reads the tag on each package as it passes, whereby the pusher mechanism and pusher plate are operated to push a package onto the respective receiver line when the designated package information read from a package tag matches the information received from the central computer.

2. Apparatus for RFID tagging of packages comprising:
   a conveyor for transporting packages along a predetermined path, with tags having microchips and antennae applied to the packages;
   a sensor for reading information including bar codes or other indicia from each package transported on said conveyor as a package passes the sensor;
   a central computer connected to the sensor to receive the information on each package passing from said sensor;
   encoding means including a transmitter for encoding the tags by transmitting radio waves providing information about package identification to the microchips of the tans, via the antennae of the tags, the encoding means being controlled by the central computer;
   tap applying means for applying an encoded tap to a package proximate thereto, the tap applying means being controlled by the central computer;

verifying means for verifying said applied tag for proper installation and proper activation, the verifying means being connected to the central computer; and a palletizer system at a predetermined location downstream from the tag applying means for removing encoded packages from the conveyor and delivering at least some encoded packages to at least one pallet station, the palletizer system being connected to receive signals from the central computer;

wherein the encoding means is disposed upstream of the location of the palletizer system;

wherein the palletizer system includes:

a plurality of discharge controllers positioned sequentially along the transport conveyor, each discharge controller being connected to the central computer to receive respective package information, each discharge controller having associated therewith a package sensor;

a pusher and a pusher plate associated with each discharge controller;

a plurality of receiver conveyor lines connected respectively to receive packages from a respective discharge controller pusher and pusher plate; and a plurality of pallet stations connected one each to a respective receiver conveyor line;

wherein each discharge controller and the associated pusher and pusher plate are operated to push a package onto the respective receiver conveyor line in response to the package information received from the central computer.

3. The apparatus of any one of claims 1 and 2, wherein each pallet station includes:

a rotatable pallet plate capable of holding packages received from a respective receiver conveyor line;

a pallet motor mechanism connected to rotate the pallet plate; and a web of wrapping material positioned proximate to the rotatable pallet plate.

4. The apparatus of any one of claims 1 and 2, wherein the palletizer system further includes means for transferring tagged packages from each respective receiver line to the respective pallet station associated therewith.

5. The apparatus of any one of claims 1 and 2, wherein the means for applying the tags to packages includes fluid-impelled apparatus for delivery of the tags to the packages, the fluid-impelled delivery being controlled by signals from the central computer.

6. The apparatus of claim 5, wherein the fluid-impelled apparatus comprises:

a motor controlled by the central computer;

a valve operated by the motor;

a compressed air line leading from the valve; and an air delivery plate positioned to impel tags toward a package passing by on the transport conveyor.

7. The apparatus of any one of claims 1 and 2, wherein the tag applying means controlled by the central computer includes a tag applicator, and means for vertically adjusting the position at which tags are applied to packages.

8. The apparatus of claim 7, also including means for delivering tags to the tag applicator having an elongate tape with tags carried thereon; and means for separating the tags from the tape, wherein the tag delivering means controls the tag delivery by controlling tape movement in response to control signals from the computer.

9. The apparatus of claim 8, wherein the tag delivering means includes:

a pair of position rollers for positioning a package on the transport conveyor;

a position sensor for sensing a package;

a tape roll dispenser including a drive roll and a plurality of idler rolls wherein the dispensed tape travels downward to the drive roll then upward;

a tape feed controller connected to the central computer and the drive roll;

an applicator controller connected to the position sensor and to the tape feed controller; and a doctor blade positioned to intercept, in-turn, each tag on the tape to separate it from the tape.

10. The apparatus of claim 9, wherein the doctor blade is positioned proximate said drive roll, wherein the tag separation occurs when the tape is traveling downward, and wherein the tag applicator is positioned below the doctor blade.

11. The apparatus of any one of claims 1 and 2, also including:

sensing means for sensing information on a package passing by on the transport conveyor;

wherein the encoding means encodes package permanent bar code information, package history, date of manufacture and manufacturing location to a tag prior to its application to a package;

wherein the packages transported by the transport conveyor are of various heights;

wherein the tags applied to the packages are passive tags;

wherein the palletizer system includes a plurality of different receiver lines connected to the conveyor for receiving tagged packages, means for directing tagged packages to selected ones of the receiver lines depending upon the package identification encoded on tags on the packages, a plurality of pallet stations, and means for transferring packages from the receiver lines to predetermined ones of the pallet stations pursuant to a control signal from the central computer;

wherein the central computer provides encoding instructions to the encoding means; and wherein the tag applying means also includes means for delivering tags via an elongate tape by which the tags are carried, means for separating the tags from the tape, and fluid-impelled delivery apparatus.

* * * * *

UNITED STATES PATENT AND TRADEMARK OFFICE
CERTIFICATE OF CORRECTION

| | | |
|---|---|---|
| PATENT NO. | : 7,679,510 B2 | Page 1 of 1 |
| APPLICATION NO. | : 11/348557 | |
| DATED | : March 16, 2010 | |
| INVENTOR(S) | : Feldenzer | |

It is certified that error appears in the above-identified patent and that said Letters Patent is hereby corrected as shown below:

Column 4, line 54, after "associated" insert --receiver conveyor line 136, 137, 138, 140, 141, 142, 143, and 144, whereby such boxes or other packages may move along those receiver lines in the directions indicated by the arrows 145 in Figs. 3 and 6.--;

Column 5, line 34, replace "controlling" with --transmitting--;

Column 6, Claim 1, line 1, replace "to" with --for--;

Column 6, Claim 2, line 13, replace "tans" with --tags--;

Column 6, Claim 2, line 15, replace "tap applying means for applying an encoded tap" with --tag applying means for applying an encoded tag--;

Column 6, Claim 2, line 16, replace "tap" with --tag--.

Signed and Sealed this

Eleventh Day of May, 2010

David J. Kappos
*Director of the United States Patent and Trademark Office*